M. ROELLIG.
MARINE PROPULSION BY STEAM TURBINES.
APPLICATION FILED APR. 26, 1910.
972,926.
Patented Oct. 18, 1910.
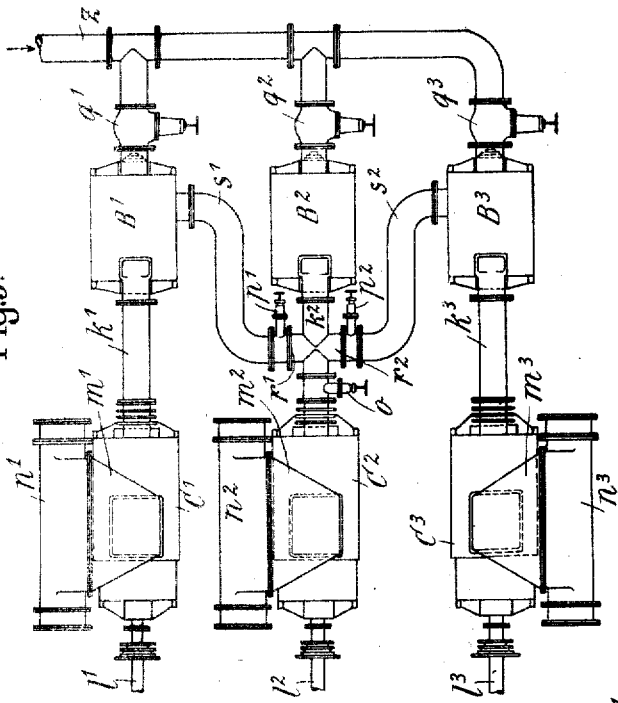
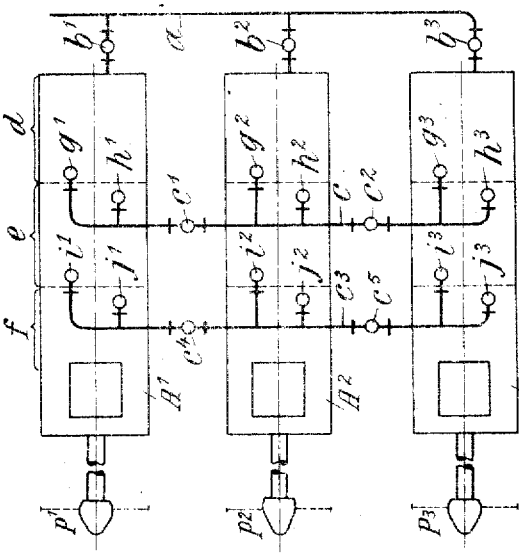
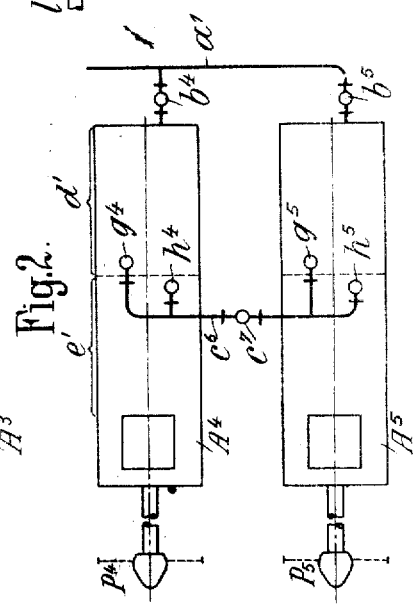
Witnesses.
Inventor.
Martin Roellig

UNITED STATES PATENT OFFICE.

MARTIN ROELLIG, OF WILMERSDORF, BERLIN, GERMANY.

MARINE PROPULSION BY STEAM-TURBINES.

972,926.

Specification of Letters Patent.

Patented Oct. 18, 1910.

Application filed April 25, 1910. Serial No. 557,344.

*To all whom it may concern:*

Be it known that I, MARTIN ROELLIG, a citizen of the Empire of Germany, residing at Wilmersdorf, Berlin, in the Empire of Germany, have invented a new and useful Marine Propulsion by Steam-Turbines, of which the following is a specification.

In the propulsion of large vessels, such as warships and the like, by means of steam turbine engines, in order to provide for a complete and satisfactory control of the vessel, it is customary, in some instances, to employ a plurality of screw or propeller shafts, each independently driven by a separate engine. This system is, however, objectionable for the reason that when the vessel is operated at a relatively slow speed the steam consumption is relatively large in proportion to the power derived, thereby reducing the efficiency of the engines. In order to overcome this difficulty it is usual, when low speeds are desired, to stop one or more of the engines entirely, allowing the corresponding propellers to remain idle and driving the remaining engines under full pressure in order to reduce the steam consumption per horse-power-hour, which is accomplished by the reduction of the total cross sectional area for the passage of the steam in the engines in accordance with the smaller steam consumption, so that throttling and leakage losses are reduced. It is also to be noted that only a part of the condenser installation need be used. This increased efficiency is, however, largely offset by the drag or resistance of the idle propellers which imposes additional work upon the engines in operation, so that the power required to propel the vessel in this manner is larger, for a given speed, than that required to drive all of the shafts. For example, in a vessel provided with three shafts, if only one shaft is positively driven, the extra power required amounts to 30% or more.

My invention has for its object to overcome the above difficulties by providing a series of engines each comprising a plurality of sections and means for cutting out one or more sections of each engine.

To this end the invention comprises a pipe system with stop valves connecting the several engines and their individual sections, so that by opening and closing the several valves in certain arrangements a part of each engine can receive live steam and a part be shut off, so that the total cross sectional area for the passage of steam in the several engines is reduced in accordance with the reduced steam consumption, and thus an economy in steam is effected, which economy is not offset by any drag of idle propellers.

The more particular objects of the invention, together with means whereby the same may be carried into effect, will best be understood from the following description of certain forms or embodiments thereof chosen for illustrative purposes and shown in the accompanying drawings, in which:

Figure 1 is a diagrammatic view of a system comprising three propeller shafts and separate steam turbine engines having each three sections. Fig. 2 is a similar view of a system comprising two shafts and two engines having each two sections; and Fig. 3 is a diagrammatic view of a system adapted for use in connection with high and low pressure steam turbine engines.

In the system illustrated in Fig. 1, the three propellers $P'$, $P^2$, $P^3$ are each independently driven by one of the three separate steam turbine engines $A'$, $A^2$, $A^3$, each of which comprises three separate sections $d$, $e$, $f$, but which may be otherwise of any suitable and approved construction. Each of the sections $d$, $e$, $f$, comprises one or more turbine rings or disks mounted on the propeller-shaft and operating in a chamber separate from the other sections. The live steam is supplied through a main pipe $a$ and can be admitted to the first sections $d$ of the three engines $A'$, $A^2$, $A^3$, through branches and stop valves, $b'$, $b^2$, $b^3$ respectively, of any suitable construction. The outlets of the first sections $d$ of the three engines are connected by means of valves $g'$, $g^2$, $g^3$, and branches with a main pipe $c$ provided with separate stop valves $c'$ and $c^2$. The main pipe $c$ in turn is connected with the inlets of the second sections $e$ of the three engines $A'$, $A^2$, $A^3$ by means of branches and valves $h'$, $h^2$, $h^3$, of any suitable construction. The outlets of the second sections $e$ of the three engines are connected by means of valves $i'$, $i^2$, $i^3$, and branches with a further main pipe $c^3$ provided with separate stop valves $c^4$ and $c^5$. The main pipe $c^3$ in turn is connected with the inlets of the third sections $f$ of the three engines by means of branches and valves $j'$, $j^2$, $j^3$. The outlets of the third sections $f$ may be separately connected with condensers (not shown) of any suitable construction.

The system thus far described is operated as follows: When the vessel is to be run at a low speed, the live steam is admitted to the first section $d$ of any one of the three engines only, for example A', the stop valve $b'$ being alone opened and the remaining stop valves $b^2$ and $b^3$ remaining closed. The steam leaving the first section $d$ of the first engine A' is not permitted to enter the second section $e$ of the same engine, but is conducted to the inlet of the second section $e$ of any of the other engines, for example A³, the valves $g'$, $c'$, $c^2$ and $h^3$ being opened, but the other valves $h'$, $g^2$, $h^2$, and $g^3$ remaining closed. The steam leaving the second section $e$ of the third engine A³ is then conducted to the third section $f$ of the second engine A², the valves $i^3$, $c^5$, and $j^2$ being alone opened, but the other valves $j^3$, $i^2$, $c^4$, $i'$, and $j'$ remaining closed. The steam leaving the third section $f$ of the second engine A² is then conducted to the exhaust or condenser of the latter. It will be seen that all the three propellers P', P², P³ are simultaneously but independently driven, the propeller P' being driven by the first section $d$ of the engine A', the propeller P² by the third section $f$ of the engine A², and the propeller P³ by the second section of the engine A³. Of course the sections may also be connected to operate in any other suitable arrangement, for example, the section $d$ of the engine A², the section $e$ of the engine A³, and the section $f$ of the engine A' may be rendered operative and the remaining sections inoperative. When it is desired to run the vessel at a higher speed but less than the maximum, fresh steam is simultaneously admitted to the first section $d$ of any two of the three engines, for example A' and A², the stop valves $b'$ and $b^2$ being opened and the third stop valve $b^3$ remaining closed. The steam leaving the first sections of the two first engines A' and A² is then permitted to enter the second section $e$ of the third engine A³ and any of the first engines, for example A², the valves $g'$, $c'$, $h^2$, $g^2$, $c^2$, and $h^3$ being opened, but the other valves $h'$ and $g^3$ remaining closed. The steam leaving the second sections $e$ of the two last engines A² and A³ is then conducted to the third sections $f$ of those engines in which so far the steam has been admitted to one section only, that is the engines A³ and A'. From the third sections $f$ the steam then passes to the corresponding exhausts or condensers. In this manner the steam is caused to pass through two subsequent sections of each engine. It is, of course, to be understood that the order in which the steam passes through the various sections of the several engines may be varied for obtaining the same results, in many ways, as will be obvious without further description.

Fig. 2 shows a system for a vessel with two screw propellers P⁴ and P⁵, in which the two separate steam turbine engines A⁴ and A⁵ each comprise only two sections $d^1$ and $e^1$, while their specific construction is otherwise immaterial to my invention. The fresh steam is supplied through a main pipe $a'$ and can be admitted to the first sections $d'$ of the two engines through valves $b^4$ and $b^5$ of any suitable construction. The outlets of the first sections $d'$ are connected by valves $g^4$ and $g^5$ with a main pipe $c^6$ in which a stop valve $c^7$ may be inserted. The main pipe $c^6$ in turn is connected by valves $h^4$ and $h^5$ with the inlets of the second sections $e'$, while the outlets of the latter may be connected with separate condensers (not shown) of any suitable construction. In this case at a reduced speed of the vessel the steam passes from the main pipe $a'$ through the section $d'$ of the engine A⁴ to the section $e'$ of the engine A⁵ and through these to the condenser, or also in a similar manner beginning with the section $d'$ of the engine A⁵.

Fig. 3 diagrammatically illustrates a system which is very simple and suitable for a vessel with three propellers. The three propeller shafts are denoted by $l'$, $l^2$, $l^3$, and are each driven by an engine comprising a high pressure section B', B², B³ and a low pressure section C', C², C³. The live steam is supplied through a main pipe $z$ and is admitted to the three high pressure sections B', B², B³, through valves $q'$, $q^2$, $q^3$. The outlets of the three high pressure sections are connected with the inlets of the corresponding low pressure sections by pipes $k'$, $k^2$, $k^3$, respectively. The outlets of the low pressure sections C', C², C³ are separately connected by exhaust chambers $m'$, $m^2$, $m^3$ with their condensers $n'$, $n^2$, $n^3$ of any suitable construction. In this system, according to my invention, a stop valve $o$ is inserted in the pipe $k^2$ between the sections B² and C² of the central engine, and the pipe $k^2$ is provided with two opposite branch connections $r'$ and $r^2$, which are connected by pipes $e'$ and $e^2$ with the two adjacent high pressure sections B' and B³. Stop valves P' and P² are preferably inserted between the connections $r'$, $r^2$ and the pipes $s'$, $s^2$. The points at which pipes $s'$, $s^2$ connect with the sections B', B³ should be so selected that the steam from the pipes $s'$, $s^2$ does not pass through the first portions of these sections, and so that the end cross sectional area of the central high pressure section B² is approximately equal to the sum of the cross sectional areas of the two sections B' and B³ at the points of connection of the pipes $s'$, $s^2$, so that there will be a regular increase of the areas. At full or high speed of the vessel the steam is simultaneously admitted from the main pipe $z$ to the three high pressure sections $B'$, $B^2$, $B^3$, so that the steam leaving the latter passes directly through the pipes $k'$, $k^2$, $k^3$, to the corresponding low pressure sections $C'$, $C^2$, $C^3$ and thence through their exhaust chambers at $m'$, $m^2$, $m^3$ to their condensers $n'$, $n^2$, $n^3$. If the vessel is to run at half speed, however, the stop valve $q^2$ is alone opened to admit the fresh steam to the central high pressure section $B^2$, while the stop valve $o$ is closed and the two valves $p'$ and $p^2$ are opened, so that the steam leaving the central high pressure section $B^2$ passes through the pipes $s'$ and $s^2$ to the two neighboring high pressure sections $B'$ and $B^3$, parts of which it passes through, after which it enters the pipes $k'$ and $k^3$ and the corresponding low pressure sections $C'$ and $C^3$ to the condensers $n'$ and $n^3$.

From the foregoing it will be seen that my invention contemplates so interconnecting individual turbines or groups of turbines that individual sections may be thrown out of operation, whereby a plurality of shafts may be driven at a reduced speed, the cross sectional area for the passage of the steam in the turbines being however, reduced in accordance with the reduced quantities of steam passing through. For this purpose it is not necessary that the sections in the various engine groups be equal to each other. On the contrary, for the sake of economy, a varying division may be adopted and is in fact preferable.

I claim:—

1. A system of marine propulsion comprising, in combination, a plurality of propeller shafts, a steam turbine engine operatively connected with each of said shafts for independently driving the same, each of said engines comprising a plurality of separate sections, means for supplying live steam to said engines, means for shutting off the supply of steam to one or more of the sections of each engine, and steam connections between the sections of the several engines, substantially as and for the purpose set forth.

2. A system of marine propulsion comprising, in combination, a plurality of propeller shafts, a steam turbine engine operatively connected with each of said shafts for independently driving the same, each of said engines comprising a plurality of separate sections and means for conveying steam successively from one of said sections to another, means for supplying live steam independently to each of said engines, a valve or valves for controlling the passing of steam between adjacent sections in each of said engines, and steam connections between the sections of the several engines, substantially as and for the purpose set forth.

MARTIN ROELLIG.

Witnesses:
HENRY HASPER,
WOLDEMAR HAUPT.